US006542447B1

(12) United States Patent
Matsuo et al.

(10) Patent No.: US 6,542,447 B1
(45) Date of Patent: Apr. 1, 2003

(54) MAGNETO-OPTICAL PICKUP

(75) Inventors: Daisuke Matsuo, Kodaira (JP); Nobuyoshi Iwasaki, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 282 days.

(21) Appl. No.: 09/695,083

(22) Filed: Oct. 24, 2000

(30) Foreign Application Priority Data

Oct. 29, 1999 (JP) ............................................ 11-310144

(51) Int. Cl.[7] .................................................. G11B 7/09
(52) U.S. Cl. ................................ 369/44.23; 369/112.28; 369/112.21
(58) Field of Search ........................ 369/44.23, 110.02, 369/110.04, 112.09, 112.1, 112.14, 112.15, 112.17, 112.18, 112.19, 112.21, 112.28

(56) References Cited

U.S. PATENT DOCUMENTS

| | | | | |
|---|---|---|---|---|
| 5,708,644 A | * | 1/1998 | Hasegawa | 369/112.19 |
| 5,790,504 A | * | 8/1998 | Hayashi et al. | 369/44.23 |
| 6,192,020 B1 | * | 2/2001 | Takasuka et al. | 369/44.23 |

FOREIGN PATENT DOCUMENTS

JP    8-329544    12/1996
JP    10-143934    5/1998

* cited by examiner

*Primary Examiner*—Thang V. Tran
(74) *Attorney, Agent, or Firm*—Frishauf, Holtz, Goodman & Chick, P.C.

(57) ABSTRACT

A magneto-optical pickup includes a light source for emitting a light beam, the light beam traveling to an information recording medium along a first optical path, a first light receiving element group for detecting an error signal, a second light receiving element group for detecting a magneto-optical signal, the first and second light receiving element groups being situated substantially on one plane, a diffraction grating for diffracting light returned along the first optical path from the information storage medium, the diffracted light being directed toward the first light receiving element group, a polarization beam splitter for separating a part of the return light from the information storage medium, a beam of the separated part of return light traveling to the second light receiving element group along a second optical path, a mirror for bending the second optical path, the light beam reflected thereby being directed toward the second light receiving element group, and an anisotropic optical crystal member having an optic axis inclined to the optical axis at an angle within the range between 30° and 60°, the crystal member including a parallel flat plate portion, which is between the mirror for bending the second optical path and the first light receiving element group.

14 Claims, 5 Drawing Sheets

MAGNETO-OPTICAL PICKUP

CROSS-REFERENCE TO RELATED APPLICATIONS

This application is based upon and claims the benefit of priority from the prior Japanese Patent Application No. 11-310144, filed Oct. 29, 1999, the entire contents of which are incorporated herein by reference.

BACKGROUND OF THE INVENTION

The present invention relates to an optical device for optically processing information by light beam scanning, and more particularly, to a magneto-optical pickup for detecting magneto-optical signals.

Recently developed magneto-optical pickups are designed so that a plurality of functions and elements are integrated to ensure smaller sizes and lower costs.

Jpn. Pat. Appln. KOKAI Publication No. 8-329544 discloses a small-sized magneto-optical pickup, which is schematically shown in FIG. 12.

Figure 12:
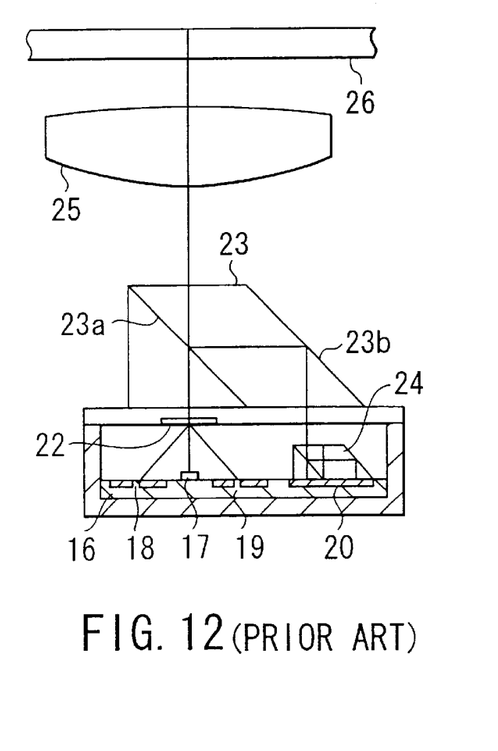
FIG. 12 shows a prior art magneto-optical pickup.

In FIG. 12, a beam of laser light emitted from a semiconductor laser 17 is transmitted through a polarizing prism 23 and converged on an information storage medium 26 by an objective lens 25.

The beam of laser light including information, which is reflected by the information storage medium 26, is split into two by a surface 23a of the polarizing prism 23 in accordance with the polarization. Light components transmitted through the surface 23a are diffracted by a holographic diffraction element 22 and then detected as focus and tracking error signals by light receiving elements 18 and 19 on a substrate 16.

On the other hand, a beam of light components reflected by the surface 23a is deflected by a mirror surface 23b, and then split into two by a prism-type analyzer 24, which includes a plurality of prisms and a polarizing film, located on the substrate 16. The split beams are detected as magneto-optical signals by a light receiving element group 20.

The light receiving elements 18 and 19 and the light receiving element group 20 are all formed on the same substrate 16, and the laser light source 17 is also mounted on the substrate 16. The substrate 16, along with the prism-type analyzer 24, is sealed mainly in a small-sized resin package.

Jpn. Pat. Appln. KOKAI Publication No. 8-329544 also teaches a method for detecting magneto-optical pickup signals by using a polarizing diffraction element in stead of the prism-type analyzer 24, with a beam of light including information split into three beams of 0th and ±1st order diffracted light.

Further, Jpn. Pat. Appln. KOKAI Publication No. 10-143934 disclosed an improved magneto-optical pickup based on an additionally developed technique, which is schematically shown in FIG. 13.

Figure 13:
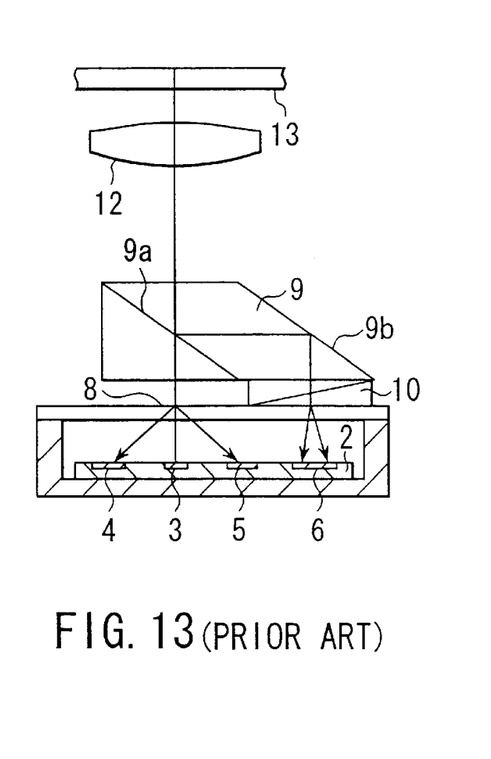
FIG. 13 shows another prior art magneto-optical pickup.

In FIG. 13, a laser beam emitted from a laser diode 3 is transmitted through a polarizing prism 9 and converged on an information storage medium 13 by a objective lens 12.

The laser beam reflected by the information storage medium 13 is split into two by a surface 9a of the polarizing prism 9 in accordance with the polarization. Light components transmitted through the surface 9a are diffracted by a holographic diffraction element 8 and detected as error signals, such as focus and tracking error signals, by light receiving elements 4 and 5 on a substrate 2.

On the other hand, a beam of light components reflected by the surface 9a is deflected by a mirror surface 9b, and then split into two beams in accordance with the polarization by a Wollaston prism 10, which is united with the polarizing prism 9. The split beams are detected as magneto-optical signals by a light receiving element group 6.

The light receiving elements 4 and 5 and the light receiving element group 6 are all formed on the same substrate 2, and the laser light source 3 is also mounted on the substrate 2. The substrate 2 is sealed mainly in a small-sized resin package.

Using the prism-type analyzer for the separation of the magneto-optical signals, the magneto-optical pickup shown in FIG. 12 includes a very large number of components. Further, each component requires high working accuracy, and its assembly also requires high accuracy.

In particular, mounting the prism-type analyzer itself on the substrate requires very high accuracy, and naturally, mounting the polarizing prism for guiding light to the analyzer also requires high accuracy. If the mounting accuracy of the analyzer 24 is unsatisfactory, therefore, adjustment cannot be carried out when the polarizing prism 23 is mounted, in some cases. If the mounted analyzer is concluded to be defective by inspection after assembly, therefore, the semiconductor laser, light receiving element substrate, and package, which are rather expensive, must possibly be scrapped.

Use of the polarizing diffraction element for separation of the magneto-optical signals also requires high working and mounting accuracies. Further, the polarizing diffraction element itself is very expensive. Since a light beam is split at angles by the diffraction element, in particular, the distances between the diffraction element and the light receiving element group must be adjusted and maintained with high accuracy. Partly because the package is formed mainly of resin, moreover, the resulting pickup is susceptible to change of the environmental conditions.

The magneto-optical pickup shown in FIG. 13 entails high manufacturing cost, since it uses the very expensive Wollaston prism for the separation of the magneto-optical signals. This pickup, like the foregoing magneto-optical pickup, moreover, requires high mounting accuracy.

Since the Wollaston prism deflects beams in ordinary and extraordinary rays in different directions, in particular, high mounting accuracy is needed to focus spots correctly on the light receiving elements. Further, fluctuations of the distance between the Wollaston prism and the light receiving element substrate prevent the spots from being focused correctly on the light receiving elements. Since the package is formed mainly of resin, this magneto-optical pickup is susceptible to change of the environmental conditions. In order to secure a long distance of separation between the beams in ordinary and extraordinary rays, furthermore, the space between the Wollaston prism and the light receiving element substrate should be adjusted to a certain dimension. Accordingly, the size of the pickup can be reduced only limitedly.

Thus, according to the conventional magneto-optical pickups, a lot of components or expensive parts must be assembled with very high accuracy.

BRIEF SUMMARY OF THE INVENTION

The object of the present invention is to provide a magneto-optical pickup, which requires relatively low mounting accuracy and is small-sized and low-priced.

Additional objects and advantages of the invention will be set forth in the description which follows, and in part will be

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Preferred embodiments of the present invention will now be described with reference to the accompanying drawings.

First Embodiment

Figure 1:
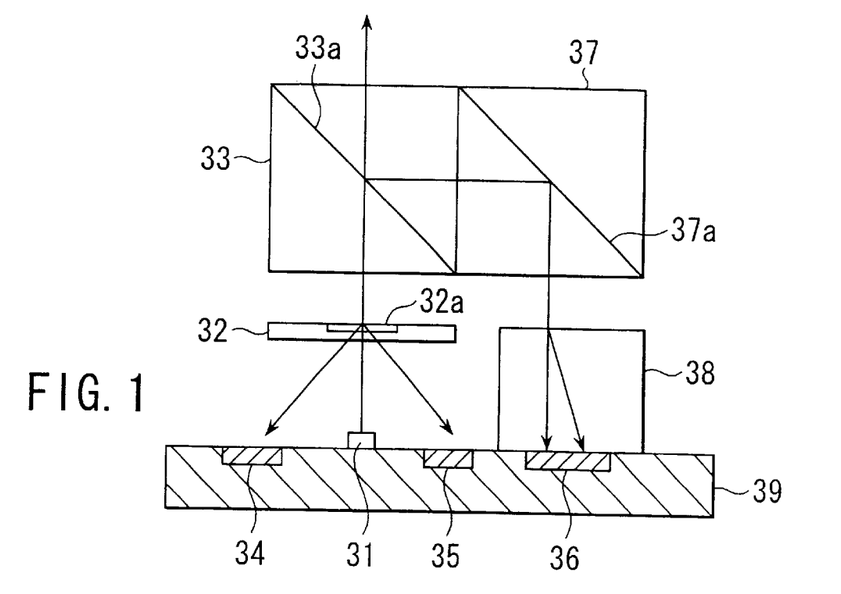
FIG. 1 shows a magneto-optical pickup according to a first embodiment.

As shown in FIG. 1, a magneto-optical pickup according to a first embodiment comprises a laser light source 31 for emitting a light beam for information reproduction, a first light receiving element group, which includes light receiving elements 34 and 35, for detecting error signals, and a second light receiving element group 36 for detecting magneto-optical signals. The light receiving elements 34 and 35 and the second light receiving element group 36 are formed on one silicon substrate 39, and therefore, are situated on a common plane. The laser light source 31 is mounted on the silicon substrate 39 so that a light beam is emitted at right angles to the upper surface of the substrate 39.

The laser light source 31 may be located at the bottom of a recess having a 45° slope, formed in the silicon substrate 39 by etching, for example, so that a light beam emitted from the light source 31 parallel to the upper surface of the substrate 39 is deflected upward by the 45° slope.

The magneto-optical pickup has a first optical path. The light beam emitted from the laser light source 31 travels to an information storage medium (not shown) along the first optical path. Arranged on the first optical path are a collimating lens for collimating the light beam and an objective lens for converging the light beam on the storage medium. The direction of polarization of the light applied to the storage medium is changed according to recorded information, and the resulting reflected light returns along the first optical path.

The magneto-optical pickup comprises a transparent flat plate 32 having a diffraction grating 32a for diffracting the light that returns from the information storage medium along the first optical path. Beams of diffracted light are directed toward the light receiving elements 34 and 35, respectively.

The magneto-optical pickup has a second optical path, and comprises a polarization beam splitter 33 for separating or deflecting partial components of the light that returns from the information storage medium along the first optical path. The light components separated or deflected by the beam splitter 33 travel to the second light receiving element group 36 along the second optical path. The pickup further comprises a mirror prism 37 for bending the second optical path. The prism 37 serves to reflect the light components from the beam splitter 33, thereby directing them toward the second light receiving element group 36.

Figure 2:
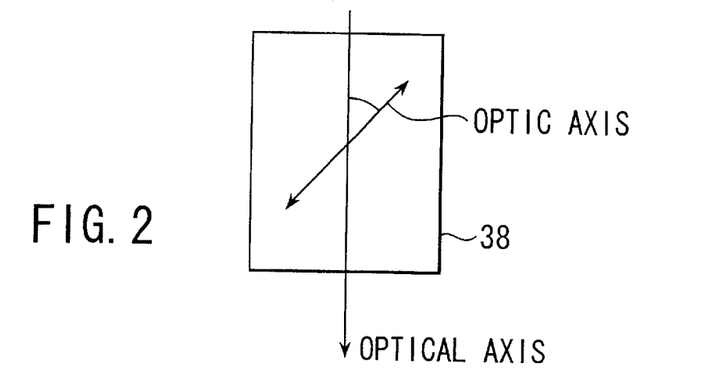
FIG. 2 shows the inclination of an optic axis of a parallel flat plate shown in FIG. 1 with respect to the optical axis.

The magneto-optical pickup further comprises a parallel flat plate 38, which is located between the mirror prism 37 and the second light receiving element group 36. The plate 38 is of an anisotropic optical crystal, and has an optic axis inclined to the optical axis, as shown in FIG. 2. An angle of inclination of the optic axis to the optical axis is within the range between preferably 30° and 60°, and more preferably between 40° and 50°, and most preferably 45°. Further, the optic axis of the parallel flat plate 38 is also inclined at about 45° to the direction of polarization of the incident light.

In FIG. 1, the light beam emitted from the laser light source 31 is transmitted through the transparent flat plate 32 having the diffraction grating 32a and then through the polarization beam splitter 33. Thereafter, the light beam is changed into a collimated light beam by the collimating lens (not shown) and converged on the information storage medium (not shown) by the objective lens (not shown).

The return light from the storage medium, including information, having passed through the objective lens and the collimating lens, reaches at the polarization beam splitter 33. Some components of the return light are reflected by a polarizing film 33a of the polarization beam splitter 33, while the remaining light components are transmitted through the beam splitter 33.

The light components transmitted through the polarization beam splitter 33 are diffracted by the diffraction grating 32a, therefore two beams of −1st order diffracted light and +1st order diffracted light appear. The light quantities of the −1st order diffracted light and +1st order diffracted light are detected by the light receiving elements 34 and 35, respectively, each of which has light receiving regions divided in given shapes or a plurality of light receiving elements. Based on the detected quantities, focus error signals and tracking error signals are detected.

On the other hand, a beam of light components reflected by the polarization beam splitter 33 is reflected by a mirror 37a of the mirror prism 37, and enters the parallel flat plate 38 of an anisotropic optical crystal. For example, the plate 38 is of lithium niobate (LN), a uniaxial anisotropic optical crystal. Laser light incident upon the plate 38 is split into two parts, ordinary and extraordinary rays, by its optical anisotropy with respect to the optic axis of the anisotropic optical crystal and the appropriate inclination of the optic axis to the incident light. The respective light quantities of the split light beams in ordinary and extraordinary rays are detected by the second light receiving element group 36, which comprises two light receiving elements formed on the silicon substrate 39. Magneto-optical information is detected in accordance with the detected light quantities.

Preferably, the parallel flat plate 38 of LN has a thickness of 2 mm to 6 mm. A thickness less than 2 mm is too small to separate the beams in ordinary and extraordinary rays sufficiently, so that the signal-to-noise ratio is worsened. Although a thickness greater than 6 mm ensures a sufficient distance for separation, it requires the silicon substrate 39 to be increased correspondingly in size. In this case, the entire magneto-optical pickup is too large in size to be practical and attain its purpose.

A parallel flat plate of 4-mm thickness, as a specific example, gives a distance for separation of about 150 mm between the beams in ordinary and extraordinary rays. A distance of at least 80 mm should be secured for the separation, depending on the shapes of spots on the light receiving elements.

Although the specific values have been given for the thickness of the parallel flat plate of LN, a value for the necessary separation distance is selected as the thickness of the parallel flat plate, which is formed of any other anisotropic optical crystal than LN, in consideration of the specific refractive index of the material for the ordinary and extraordinary rays. Quartz, KTP, lithium tantalate, calcite, rutile, etc. may be used as the other material than LN. Since calcite and rutile are subject to a very great difference in refractive index between the ordinary and extraordinary rays, in particular, a long separation distance can be secured favorably with use of a thickness smaller than the thickness of the LN plate.

In this magneto-optical pickup, the parallel flat plate of the anisotropic optical crystal having a given optic axis direction is used as a separating optical element for separating magneto-optical signals. Therefore, the pickup requires no adjustment of location of the separating optical element with respect to the optical axis, so that it can be assembled efficiently.

Since the separating optical element comprises a parallel flat plate, which is highly workable and can be adjusted in thickness with high accuracy. Thus, the separation distance can be: adjusted with very high accuracy.

Furthermore, separating optical elements of this type can be mass-produced at low cost, since they can be obtained by only cutting a wafer-shaped material, e.g., LN, of a given thickness having a given orientation to pieces of a proper size. In particular, LN is a very suitable material that is currently mass-produced at very low cost and has reliable quality and high availability.

Modification 1

Figure 3:
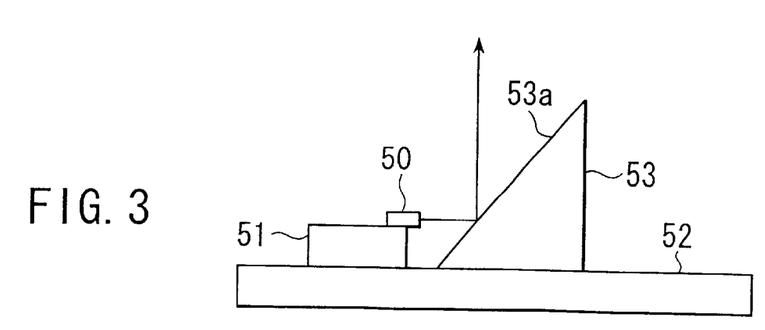
FIG. 3 shows a modification of the way of mounting a laser light source according to the first embodiment.

FIG. 3 shows a modification of the way of mounting the laser light source according to the present embodiment. In this modification, as shown in FIG. 3, a laser chip 50, which is equivalent to the laser light source 31, is mounted on a silicon substrate 52, which is equivalent to the silicon substrate 39, through a sub-mount 51. A mirror block 53, which is also mounted the substrate 52, has a mirror surface 53 a inclined at an angle of about 45° to the direction of emission of light beams. A light beam emitted from the laser chip 50 is deflected at right angles to the upper surface of the silicon substrate 52 by the mirror surface 53a of the mirror block 53.

This arrangement does not require etching or any other work on the silicon substrate 52, so that it can be manufactured with ease. Besides, the position of an imaginary point of emission as viewed from above, that is, a point of reflection of the laser beam on the mirror surface 53a, can be adjusted by shifting the location of the mirror block 53. Thus, the mounting accuracy for the laser light source and the light receiving elements can be eased.

Modification 2

Figure 4:
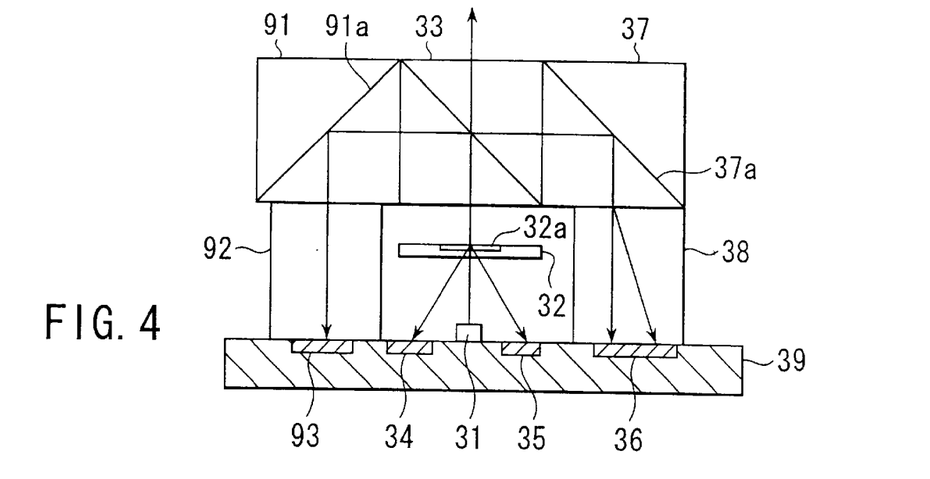
FIG. 4 shows a modification of the magneto-optical pickup of the first embodiment.

FIG. 4 shows a modification of the magneto-optical pickup according to the present embodiment. As shown in FIG. 4, this magneto-optical pickup is formed by additionally providing the magneto-optical pickup of FIG. 1 with a mirror prism 91, a transparent parallel flat plate 92, and a light receiving element 93. The prism 91 is bonded to the polarization beam splitter 33. The parallel flat plate 92 is located between the prism 91 and the silicon substrate 39. The flat plate 92 may be in the form of a square pole, such as a rectangular parallelepiped, or a cylinder.

The magneto-optical pickup has a third optical path, and the polarization beam splitter 33 separates some components of the light beam emitted from the laser light source 31. The separated light components travel along the third optical path to the light receiving element 93. The mirror prism 91 and the parallel flat plate 92 guide the light components separated by the beam splitter 33 to the element 93.

The light receiving element 93 for monitoring the output of the laser light source 31 is formed on the silicon substrate 39, on which the light receiving element group 34 and 35 and the second light receiving element group 36 are formed. Thus, the light receiving element 93 is situated flush with the first and second light receiving element groups 34, 35 and 36.

Some light components of the light beam emitted from the laser light source 31 are reflected by the polarizing film 33a of the polarization beam splitter 33 and then by a mirror surface 91a of the mirror prism 91. Then, the light components are transmitted through the parallel flat plate 92 and applied to the light receiving element 93 on the silicon substrate 39. The element 93 outputs a signal corresponding to the quantity of the incident light. The output of the laser light source 31 is controlled in response to the output signal.

According to this modification, detection of the output of the laser light source, besides the detection of error signals and magneto-optical signals, can be effected with use of only a small number of components. All the necessary functions of the magneto-optical pickup can be fulfilled with use of a high-quality compact configuration.

Preferably, the parallel flat plate 92 should be made of glass having an appropriate refractive index, or basically, a high refractive index. This is because light incident upon the flat plate 92 of a high-refraction material is totally reflected by a side face of the plate 92 without substantially leaking out, so that it reaches any other light receiving element than the light receiving element 93 as stray light and produces no noises. It is to be understood that the same advantage can be also obtained by applying a reflective paint or some other light screen coating to the side face of the parallel flat plate 92 instead of using a high-refraction material for the plate 92.

Further, the parallel flat plate 92 is expected to be as thick as the parallel flat plate 38 of the anisotropic optical crystal so that the efficiency of assembly is improved. More specifically, the magneto-optical pickup can be assembled by only arranging the parallel flat plates 38 and 92 on the silicon substrate 39 and bonding a prism block group, which is formed by previously uniting the polarization beam splitter 33 and the mirror prisms 37 and 91, to the respective upper ends of the plates 38 and 92. Further, the durability of the pickup to resist heat, vibration, and shock is improved.

Second Embodiment

A magneto-optical pickup according to a second embodiment will now be described with reference to FIGS. 5A, 5B and 5C. Basically, the pickup of the present embodiment has the same configuration as the magneto-optical pickup of the first embodiment. In these drawings, however, the polarization beam splitter and the mirror prism block group are not shown.

Figure 5A:
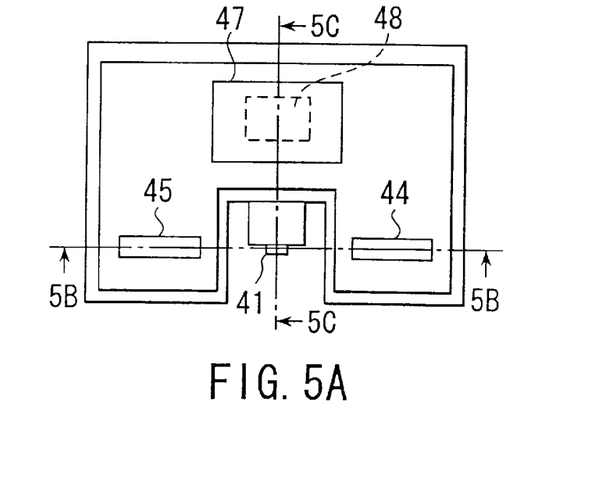
FIG. 5A is a plan view of a magneto-optical pickup according to a second embodiment.

As shown in FIG. 5A, the magneto-optical pickup according to the second embodiment comprises a laser light source 41 for emitting a light beam for information reproduction, first light receiving element group, which includes light-receiving elements 44 and 45, for detecting error signals, and a second light receiving element group 48 for detecting magneto-optical signals.

The first light receiving element group 44 and 45 and the second light receiving element group 48 are formed on one light receiving element substrate 43. The substrate 43 is formed in the shape of a U by etching. It is placed on a U-shaped spacer 42 for height adjustment. The spacer 42 is formed of an insulator, which has a metal film on its upper surface. The substrate 43 is connected electrically to the metal film of the spacer 42, and its backward bias is fetched from an exposed surface of the spacer 42.

The laser light source 41 is mounted on the substrate 43 through a sub-mount 40 so as to emit a light beam in the direction normal to the upper surface of the silicon substrate 43. The point of emission of the light source 41 is situated substantially on a straight line that connects the respective centers of the light receiving elements 44 and 45. The center of the second light receiving element group 48 is situated substantially on a straight line that extends at right angles to the straight line connecting the respective centers of the light receiving elements 44 and 45 and passes through the point of emission of the laser light source 41.

Figures 5B, 5C:
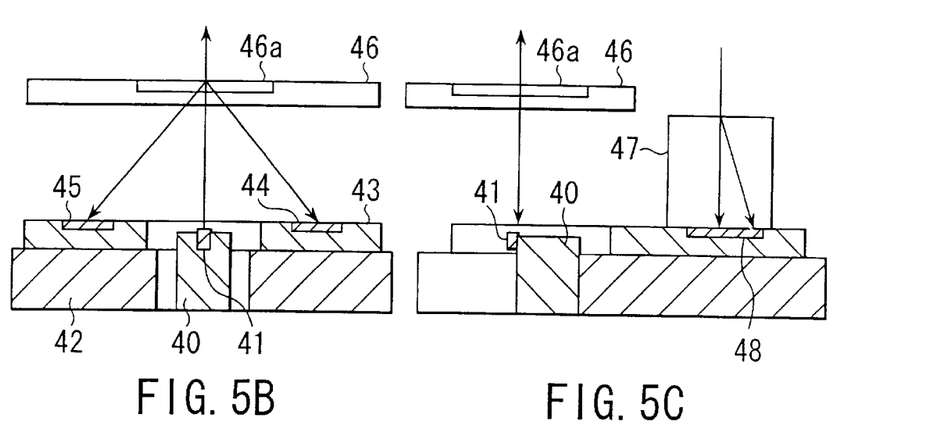
FIG. 5B is a sectional view of the magneto-optical pickup taken along line 5B—5B of FIG. 5A.
FIG. 5C is a sectional view of the magneto-optical pickup taken along line 5C—5C of FIG. 5A.

As shown in FIG. 5B, the magneto-optical pickup has a transparent flat plate 46 located above the laser light source 41. The flat plate 46 is provided with a diffraction grating 46a for diffracting return light from a storage medium and directing −1st and +1st order diffracted light beams toward the light receiving elements 44 and 45, respectively.

As shown in FIG. 5C, moreover, the magneto-optical pickup comprises a parallel flat plate 47 of an anisotropic optical crystal, which is located on the second light receiving element group 48. The plate 47, like the parallel flat plate 38 of the first embodiment, serves to split incident light into ordinary and extraordinary rays.

The light beam emitted from the laser light source 41 is transmitted through the diffraction grating 46a, then passes through the polarization beam splitter (not shown) and a collimating lens (not shown), and is converged on the information storage medium (not shown) by an objective lens (not shown).

The return light from the information storage medium, loaded with information, having passed through the objective lens and the collimating lens, reaches at the polarization beam splitter. Some components of the return light are reflected by the polarization beam splitter, while the remaining components of the return light are transmitted through the splitter.

The light components transmitted through the polarization beam splitter are diffracted by the diffraction grating 46a, therefore two beams of −1st and +1st order diffracted light appear. The respective quantities of the −1st and +1st order diffracted light beams are detected by the light receiving elements 44 and 45, and error signals are detected in accordance with the detected quantities.

On the other hand, the light components reflected by the polarization beam splitter reflected by a mirror prism (not shown) are separated into ordinary and extraordinary rays by the parallel flat plate 47 of the anisotropic optical crystal. The respective quantities of the split ordinary and extraordinary rays are detected by the light receiving element group 48 comprising at least two light receiving elements. Magneto-optical information is detected in accordance with the detected light quantities.

The magneto-optical pickup of the present embodiment is highly productive because it can be obtained by only additionally providing a conventional package of a semiconductor laser and a light source with light receiving elements, diffraction grating, polarization beam splitter, and parallel flat plate of an anisotropic optical crystal. Since the laser light source can be mounted by using existing equipment, in particular, the pickup can be produced at low cost.

Third Embodiment

Figure 6:
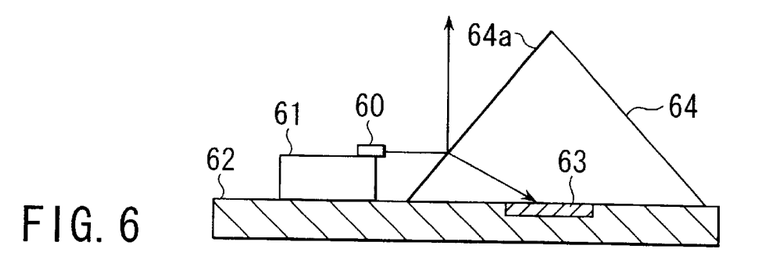
FIG. 6 shows the surroundings of a laser light source of a magneto-optical pickup according to a third embodiment.

FIG. 6 shows the peripheral portion of a laser light source of a magneto-optical pickup according to a third embodiment. The pickup of the present embodiment, which has basically the same configuration as the first embodiment, is additionally provided with a function to detect the output of the laser light source.

As shown in FIG. 6, a laser light source 60 is mounted on a silicon substrate 62 through a sub-mount 61. The magneto-optical pickup comprises a light receiving element 63, which is formed on the substrate 62, for monitoring the output of the light source 60.

A prism 64, which is located on the light receiving element 63, has a half-mirror surface 64a inclined at about 45° to the direction of emission of light beams from the laser light source 60. The surface 64a transmits some light components of a light beam emitted from the light source 60 and reflects the remaining light components at right angles to the upper surface of the silicon substrate 62. Thus, the half-mirror surface 64a separates some light components of the light beam emitted from the light source 60, and the separated light components travel through the prism 64 to the light receiving element 63.

Some light components of the light beam emitted from the laser light source 60 are transmitted through the half-mirror surface 64a of the prism 64 and applied to the light receiving element 63. The element 63 outputs a signal corresponding to the quantity of the incident light, and the signal is used to control the light source 60. As described in connection with the first embodiment, on the other hand, the light components reflected by the half-mirror surface 64a of the prism 64 are converged on the information storage medium, and the resulting return light from the information storage medium is used to detect error signals and magneto-optical signals.

This magneto-optical pickup, besides having the advantage of the first embodiment, can detect the output of the laser light source 60 without being separately provided with a beam splitter or light receiving element. Thus, the pickup can be reduced in size and lowered in cost.

Modification

Figure 7:
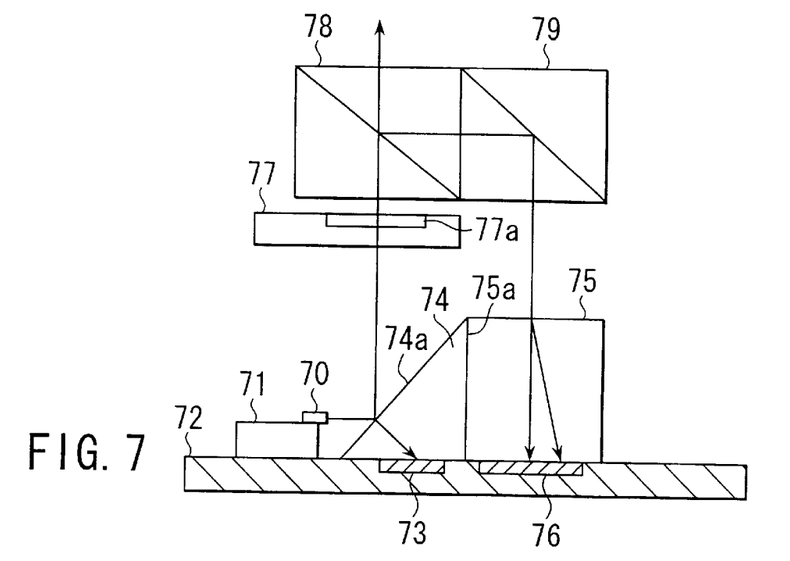
FIG. 7 shows a modification of the magneto-optical pickup of the third embodiment.

FIG. 7 shows a modification of the magneto-optical pickup according to the present embodiment. As shown in FIG. 7, a laser light source 70 is mounted on a sub-mount 71 located on a silicon substrate 72. The pickup further comprises a light receiving element 73 for monitoring the output of the light source 70. The element 73 is formed on the substrate 72, which has a light receiving element group 76 for detecting magneto-optical signals. The substrate 72 further has a light receiving element group (not shown) for detecting error signals. These light receiving element groups are arranged in the same manner as the ones according to the second embodiment.

A prism 74, which is located on the light receiving element 73, has a half-mirror surface 74a inclined at about 45° to the direction of emission of light beams from the laser light source 70. The surface 74a transmits some light components of a light beam emitted from the light source 70 and reflects the remaining light components at right angles to the upper surface of the silicon substrate 72. Thus, the half-mirror surface 74a separates some light components of the light beam emitted from the light source 70, and the separated light components travel through the prism 74 to the light receiving element 73.

The prism 74 is overlain by a transparent flat plate 77, which has a diffraction grating 77a for diffracting the return light from the information storage medium and directing its −1st and +1st order diffracted light beams toward light receiving elements of the light receiving element group for error signal detection. The flat plate 77 is overlain by a polarization beam splitter 78, which transmits some light components of the return light from the storage medium and reflects the remaining light components. Bonded to the beam splitter 78 is a mirror prism 79, which deflects the reflected light components toward the light receiving element group 76 for magneto-optical signal detection.

A parallel flat plate 75 of an anisotropic optical crystal for separating beams in ordinary and extraordinary rays is located on the light receiving element group 76. The flat plate 75 is formed previously having a mirror surface 75a on its face, which is bonded to the prism 74. The mirror surface 75a serves to prevent light propagating in the prism 74 from getting into the flat plate 75, thereby restraining the SN ratio of recorded information from lowering. Thus, the parallel flat plate 75 may be formed previously having a light shielding film by painting or coating instead of the mirror surface 75a.

The prism 74 and the parallel flat plate 75 are previously bonded to each other before they are mounted on the silicon substrate 72, so as to form a trapezoid block. This trapezoid block can be manufactured with high efficiency by, for example, bonding a prism-shaped anisotropic optical crystal and a triangular half-mirror prism and then cutting the resulting structure at given intervals.

The mirror surface 75a of the parallel flat plate 75 is formed before the prism 74 and the plate 75 are bonded to each other, whereby the incidence of mistakes in orientation for the bonding operation can be lowered. The block including the prism 74 and the flat plate 75 bonded to each other serves to facilitate handling for its mounting on the silicon substrate 72 and lower the possibility of wrongly directed mounting of the plate 75 on the substrate 72.

Fourth Embodiment

Figure 8:
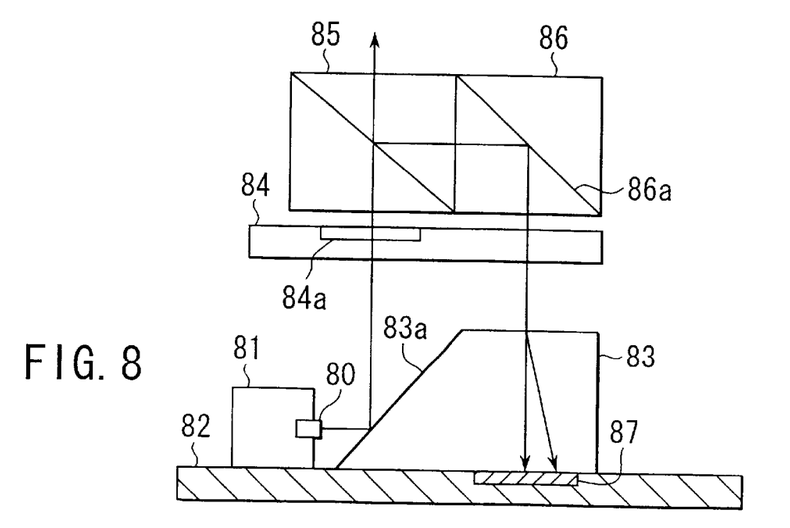
FIG. 8 shows a magneto-optical pickup according to a fourth embodiment.

FIG. 8 shows a magneto-optical pickup according to a fourth embodiment. The pickup of the present embodiment has basically the same configuration as the second embodiment.

A laser light source 80 is mounted on a sub-mount 81 located on a silicon substrate 82. The substrate 82 is provided with a light receiving element group (not shown) for detecting error signals and a light receiving element group 87 for detecting magneto-optical signals. These light receiving element groups are arranged in the same manner as the ones according to the second embodiment.

A trapezoid block 83 of an anisotropic optical crystal is located on the silicon substrate 82. The block 83 has a parallel flat plate portion, which is situated on the light receiving element group 87 for magneto-optical signal detection.

The block 83 has a mirror surface 83a inclined at about 45° to the direction of emission of light beams from the laser light source 80. The mirror surface 83a reflects a light beam from the light source 80 in the direction normal to the silicon substrate 82. The mirror surface 83a is formed, for example, by first coating chromium (Cr) and then coating gold (Au) over the inclined side of the block 83.

The mirror surface 83a is overlain by a transparent flat plate 84, which has a diffraction grating 84a for diffracting return light from an information storage medium and directing its −1st and +1st order diffracted light beams toward light receiving elements of the light receiving element group for error signal detection. The flat plate 84 is overlain by a polarization beam splitter 85, which transmits some light components of the return light from the storage medium and reflects the remaining light components. Bonded to the beam splitter 85 is a mirror prism 86, which deflects the reflected light components toward the light receiving element group 87 for magneto-optical signal detection.

As mentioned before, the parallel flat plate portion of the trapezoid block 83 of the anisotropic optical crystal is situated on the light receiving element group 87. This flat plate portion has an optic axis inclined at 45° to the optical axis, and serves to separate incident light from the mirror prism 86 into ordinary and extraordinary rays.

In FIG. 8, the light beam emitted from the laser light source 80 is reflected by the mirror surface 83a and transmitted through the transparent flat plate 84 having the diffraction grating 84a and the polarization beam splitter 85. Thereafter, the light beam passing through a collimating lens (not shown) is converged on the information storage medium (not shown) by an objective lens (not shown).

The return light from the information storage medium, loaded with information, having passed through the objective lens and the collimating lens, reaches at the polarization beam splitter 85. Some components of the return light are reflected by the polarization beam splitter 85, while the remaining components of the return light are transmitted through the splitter 85.

The light components transmitted through the polarization beam splitter are diffracted by the diffraction grating 84a of the transparent flat plate 84, therefore two beams of −1st and +1st order diffracted light appear. The respective quantities of the −1st and +1st order diffracted light beams are detected by the light receiving elements of the light receiving element group for error signal detection, and error signals are detected in accordance with the detected quantities.

On the other hand, the light components reflected by the polarization beam splitter 85 reflected by a mirror surface 86a of the mirror prism 86 are separated into ordinary and extraordinary rays by the parallel flat plate portion of the block 83 of the anisotropic optical crystal. The respective quantities of the separated ordinary and extraordinary rays are detected by the light receiving element group 87 for magneto-optical signal detection. Magneto-optical information is detected in accordance with the detected light quantities.

In this magneto-optical pickup, the trapezoid block 83 combines a function to deflect vertically a light beam emitted parallel to the upper surface of the silicon substrate 82 and a function to separate return light into ordinary and extraordinary rays for detection of magneto-optical signals, so that the number of components used in the pickup can be reduced. Since the block 83 has an appropriate size, moreover, handling for its mounting on the substrate 82 is easy, and positioning can be carried out with ease.

Fifth Embodiment

Figure 9:
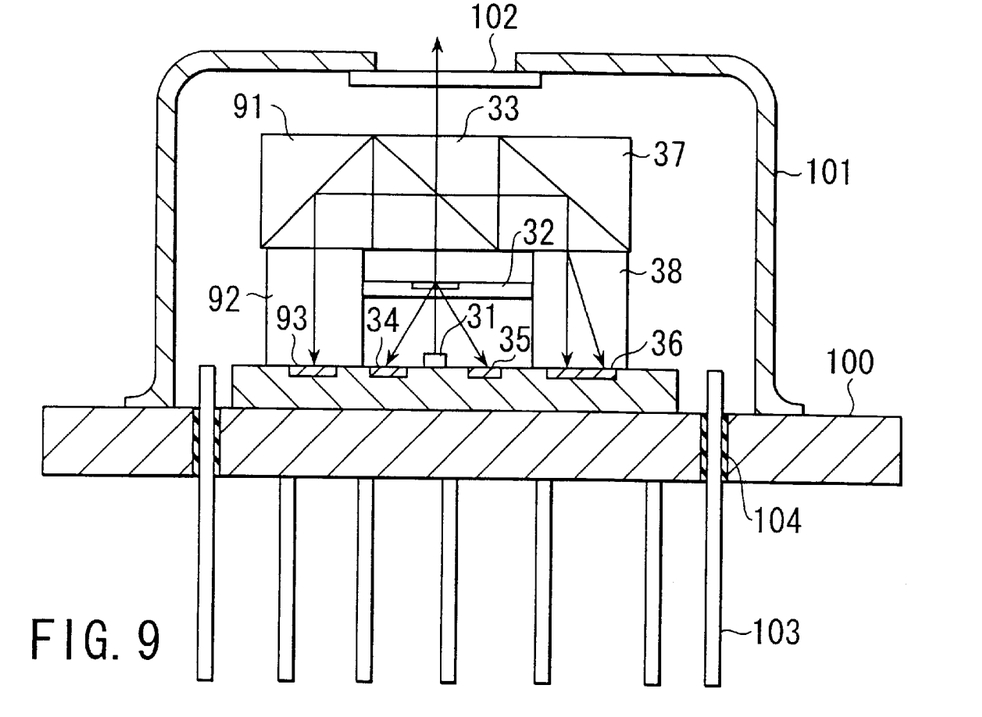
FIG. 9 shows a packaged magneto-optical pickup according to a fifth embodiment.

A packaged magneto-optical pickup according to a fifth embodiment will now be described with reference to FIG. 9. Although the magneto-optical pickup of FIG. 4 is illustrated in FIG. 9, the packaged pickup may be any of the magneto-optical pickups described above. Preferably, the pickup should have a mechanism for monitoring the light quantity of the light source, in particular.

As shown in FIG. 9, the magneto-optical pickup is placed on a package base 100 and sealed by a cap 101 having a glass window 102.

Electrode pins 103, which are fixed to the base 100 by an insulator 104, are used to supply electric power to light emitting elements and fetch electric information from light receiving elements.

A sealed internal space defined by the base 100 and the cap 101 is filled with an inert gas, such as nitrogen or argon, so that it is protected against external penetration of water or oxygen.

According to the packaged magneto-optical pickup of the present embodiment, the ambiance of the light emitting elements, in particular, is replaced with the inert gas, so that the light emitting elements can be prevented from being deteriorated or damaged by oxygen or water. Thus, the light emitting elements can enjoy long life. Since the entire unit including the light emitting elements, a beam splitter, light receiving elements, etc. is hermetically sealed by an integral package, moreover, the internal elements can enjoy a very high degree of freedom of layout. Since highly sophisticated optical elements are not exposed to the outside, furthermore, they cannot be damaged when they are incorporated into an optical disk apparatus. If the optical elements are soiled, moreover, they can be washed. Besides, an adhesive that is used in assembling the optical elements can be prevented from being expanded or deformed by water, so that fixed optical properties can be maintained.

Sixth Embodiment

Figure 10:
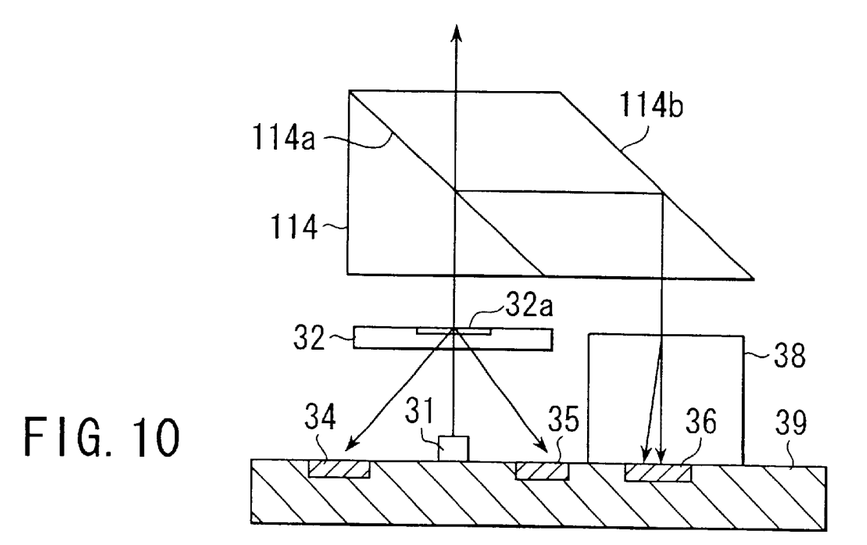
FIG. 10 shows a magneto-optical pickup according to a sixth embodiment.

A magneto-optical pickup according to a sixth embodiment will now be described with reference to FIG. 10. The present embodiment is constructed in the same manner as the first embodiment, while a composite polarization beam splitter prism 114 comprising a triangular and a parallelogrammatic prism is used in place of the polarization beam splitter 33 and the mirror prism 37. The prism 114 has a polarizing film 114a and a reflective surface 114b coated with a multi-layer film for phase control. TABLE 1 shows the properties of the multi-layer film of the reflective surface 114b.

TABLE 1

| Layer | Material | Film thickness (nm) | Refractive index |
|---|---|---|---|
| 0 | Glass |  | 1.62 |
| 1 | SiO$_2$ | 131 | 1.46 |
| 2 | TiO$_2$ | 31 | 2.25 |
| 3 | SiO$_2$ | 120 | 1.46 |
| 4 | TiO$_2$ | 68 | 2.25 |
| 5 | SiO$_2$ | 139 | 1.46 |
| 6 | TiO$_2$ | 46 | 2.25 |
| 7 | Air |  | 1.00 |

Although the present embodiment has basically the same functions as the first embodiment, it additionally has the following functions and effects.

The light totally reflected by the reflective surface 114b generally has a great phase difference between p-polarized light and s-polarized light, which are polarized at right angles to each other. Such phase difference unfortunately lower the signal quality.

Figure 11:
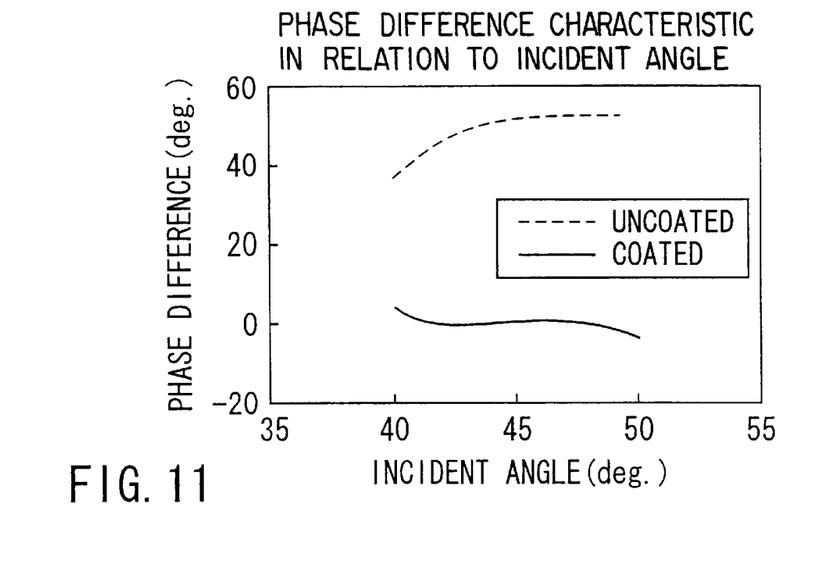
FIG. 11 is a graph showing the way of generating a phase difference according to the sixth embodiment.

The phase difference varies depending on the incident angle upon the reflective surface, in particular. If the convergent beam of light is totally reflected, as in the case of the present invention, therefore, the variation of the phase difference depending on the incident angle is greater, so that the signal quality is influenced more strongly. According to the present embodiment, however, the reflective surface 114b is coated with the multi-layer film shown in TABLE 1 to control the phase difference, so that the phase difference is reduced substantially to zero, and its variation depending on the incident angle of light upon the reflective surface can be controlled or suppressed satisfactorily. FIG. 11 shows generation of the phase difference.

According to the present embodiment, in contrast with the case where the multi-layer film (coat) is not used, the phase difference is substantially zero, and it hardly varies depending on the incident angle.

Since there is no substantial phase difference between the p-polarized light and s-polarized light on the reflective surface 114b according to the present embodiment, in particular, magneto-optical signals can be detected highly satisfactorily.

Although several embodiments have been described specifically herein with reference to the accompanying drawings, the present invention is not limited to those embodiments, therefore, various changes and modifications may be effected therein.

According to any of the embodiments described above, for example, the polarization beam splitter and the mirror prism are cubic structures. Alternatively, however, they may be formed by combing a triangular prism and a parallelogrammatic prism. Further, the package and the cap may be formed of a metal, resin, or ceramics.

The magneto-optical pickup of the present invention may be applied to a finite optical system in which emitted light is converged directly on an information storage medium by an objective lens without using a collimating lens or an infinite optical system in which light is converged by an objective lens after it is temporarily collimated by a collimating lens.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A magneto-optical pickup having first and second optical paths, comprising:
   a light source for emitting a light beam, the light beam traveling to an information recording medium along the first optical path;
   a first light receiving element group for detecting an error signal;
   a second light receiving element group for detecting a magneto-optical signal, the first and second light receiving element groups being situated substantially on one plane;
   a diffraction grating for diffracting light returned along the first optical path from the information storage medium, the diffracted light being directed toward the first light receiving element group;
   a polarization beam splitter for separating a part of the return light from the information storage medium, a beam of the separated part of return light traveling to the second light receiving element group along the second optical path; a mirror for bending the second optical path, the light beam reflected thereby being directed toward the second light receiving element group; and
   an anisotropic optical crystal member having an optic axis inclined to the optical axis at an angle within the range between 30° and 60°, the crystal member including a flat parallel plate portion, for splitting the reflected light beam from the mirror into a plurality of split light beams and directing the split light beams toward the second light receiving element group.

2. A magneto-optical pickup according to claim 1, wherein the anisotropic optical crystal member is of lithium niobate, and the parallel flat plate portion has a thickness of 2 mm to 6 mm.

3. A magneto-optical pickup according to claim 1, wherein the first light receiving element group includes two light receiving elements for receiving beams of −1st order diffracted light and +1st order diffracted light, which are diffracted by the diffraction grating, respectively, and the light source is located halfway between the two light receiving elements and emits the light beam at right angles to the one plane.

4. A magneto-optical pickup according to claim 1, wherein the light source emits the light beam parallel to the one plane, and the pickup further comprises a mirror for deflecting the light beam from the light source at right angles to the one plane.

5. A magneto-optical pickup according to claim 1, wherein the pickup, which has a third optical path, further comprises a third light receiving element for monitoring the output of the light source, the third light receiving element being situated substantially on the same plane as the first and second light receiving element groups and outputting a signal corresponding to the quantity of incident light, the signal being used to control the light source, and a separating element for separating a part of light from the light source, a beam of the separated part of light traveling to the third light receiving element along the third optical path.

6. A magneto-optical pickup according to claim 5, wherein the polarization beam splitter serves also as the separating element, the separated light beam being directed parallel to the one plane, and the pickup further comprises a mirror for bending the third optical path, a beam of the light reflected thereby being directed toward the third light receiving element, a transparent member including a parallel flat plate portion, the parallel flat plate portion being between the mirror for bending the third optical path and the third light receiving element, the parallel flat plate portion of the transparent member being as thick as the parallel flat plate portion of the anisotropic optical crystal member.

7. A magneto-optical pickup according to claim 5, wherein the light source emits the light beam parallel to the one plane, and the pickup further comprises a half-mirror for deflecting the light beam from the light source at right angles to the one plane, and a prism having a side on which the half-mirror is formed, the half-mirror serving also as the separating element, and the prism being located on the third light receiving element.

8. A magneto-optical pickup according to claim 7, wherein the prism and the anisotropic optical crystal member are previously bonded to form an integral structure.

9. A magneto-optical pickup according to claim 8, wherein the anisotropic optical crystal member has a mirror surface previously formed on the side thereof to which the prism is bonded.

10. A magneto-optical pickup according to claim 8, wherein the anisotropic optical crystal member has a shielding film previously formed on the side thereof to which the prism is bonded.

11. A magneto-optical pickup according to claim 7, wherein the anisotropic optical crystal member has a slanting side face inclined at 45° to the one plane, and the half-mirror is formed on the slanting side face of the crystal member.

12. A magneto-optical pickup according to claim 1, wherein the mirror for bending the second optical path has a phase control multi-layer film for reducing a phase difference between two polarized light components, which are polarized at right angles each other, substantially to zero throughout the effective range of the incident angle.

13. A magneto-optical pickup according to claim 1, further comprising a package for sealing all of the elements, i.e., the light source, first light receiving element group, second light receiving element group, diffraction grating, polarization beam splitter, mirror, and anisotropic optical crystal member, the internal space of the package being filled with an inert gas.

14. A magneto-optical pickup according to claim 5, further comprising a package for sealing all of the elements, i.e., the light source, first light receiving element group, second light receiving element group, diffraction grating, polarization beam splitter, mirror, and anisotropic optical crystal member, the internal space of the package being filled with an inert gas.

* * * * *